US012578496B1

(12) United States Patent
Stein

(10) Patent No.: US 12,578,496 B1
(45) Date of Patent: Mar. 17, 2026

(54) B-SCAN NORMALIZATION FOR NON-DESTRUCTIVE TESTING

(71) Applicant: SmartAuger, Inc., Wadsworth, OH (US)

(72) Inventor: Nathan Stein, Seattle, WA (US)

(73) Assignee: SmartAuger, Inc., Wadsworth, OH (US)

( * ) Notice: Subject to any disclaimer, the term of this patent is extended or adjusted under 35 U.S.C. 154(b) by 0 days.

(21) Appl. No.: 19/314,740

(22) Filed: Aug. 29, 2025

(51) Int. Cl.
*G01V 3/12* (2006.01)
*G01V 3/38* (2006.01)

(52) U.S. Cl.
CPC . *G01V 3/12* (2013.01); *G01V 3/38* (2013.01)

(58) Field of Classification Search
CPC combination set(s) only.
See application file for complete search history.

(56) References Cited

U.S. PATENT DOCUMENTS

| | | | |
|---|---|---|---|
| 6,377,872 | B1 | 4/2002 | Struckman |
| 6,621,462 | B2 | 9/2003 | Barnes |
| 8,253,619 | B2 | 8/2012 | Holbrook et al. |
| 9,244,163 | B2 | 1/2016 | Mohamadi |
| 9,395,437 | B2 | 7/2016 | Ton et al. |
| 10,145,837 | B2 | 12/2018 | Troxler |
| 10,175,350 | B1 | 1/2019 | Tsokos et al. |
| 10,203,405 | B2 | 2/2019 | Mazzaro et al. |
| 10,527,560 | B2 | 1/2020 | Annan et al. |
| 10,895,637 | B1 | 1/2021 | Padmanabhan et al. |
| 11,402,493 | B2 | 8/2022 | Stanley et al. |
| 12,111,391 | B1 | 10/2024 | Cist |

| | | |
|---|---|---|
| 2001/0019636 | A1 | 9/2001 | Slatter |
| 2006/0055584 | A1 | 3/2006 | Waite et al. |
| 2007/0154072 | A1 | 7/2007 | Taraba et al. |
| 2007/0194978 | A1 | 8/2007 | Teshirogi et al. |
| 2008/0036644 | A1 | 2/2008 | Skultety-Betz et al. |

(Continued)

FOREIGN PATENT DOCUMENTS

CN 115542278 A * 12/2022 .............. G01V 3/12

OTHER PUBLICATIONS

Ferrara, V. et al. (2018). "GPR/GPS/IMU system as buried objects locator." Measurement, vol. 114, pp. 534-541. https://doi.org/10. 1016/j.measurement.2017.05.014.

(Continued)

*Primary Examiner* — Vladimir Magloire
*Assistant Examiner* — Eric K Hodac
(74) *Attorney, Agent, or Firm* — Mintz Levin Cohn Ferris Glovsky and Popeo, P.C.

(57) ABSTRACT

A method can include receiving, from a non-destructive testing (NDT) scanner, a plurality of A-Scans of a length of a scanned region, generating a raw B-Scan of the scanned region using the plurality of A-Scans, receiving, from a position sensor coupled to the NDT scanner, a plurality of distance measurements of the NDT scanner along the length of the scanned region, matching each of the plurality of A-Scans with a distance measurement of the plurality of distance measurements to form a plurality of distance-assigned A-Scans, and normalizing the raw B-Scan, using the plurality of distance-assigned A-Scans, to form a normalized B-Scan, wherein each column of the normalized B-Scan represents the same distance along the length of the scanned region.

18 Claims, 10 Drawing Sheets
(3 of 10 Drawing Sheet(s) Filed in Color)

(56)  References Cited

U.S. PATENT DOCUMENTS

| | | |
|---|---|---|
| 2014/0285375 A1 | 9/2014 | Crain |
| 2016/0313443 A1 | 10/2016 | Al-Shuhail et al. |
| 2018/0172866 A1 | 6/2018 | Vohra et al. |
| 2018/0299412 A1 | 10/2018 | Mendes Rodrigues |
| 2019/0188533 A1 | 6/2019 | Katabi et al. |
| 2020/0341100 A1 | 10/2020 | Heukensfeldt Jansen et al. |
| 2021/0089817 A1 | 3/2021 | Hafenrichter et al. |
| 2021/0325509 A1 | 10/2021 | Santra et al. |
| 2021/0405182 A1 | 12/2021 | Reynolds et al. |
| 2022/0244194 A1 | 8/2022 | Perron et al. |
| 2023/0041835 A1 | 2/2023 | Va et al. |
| 2023/0115265 A1 | 4/2023 | Butt et al. |
| 2023/0131412 A1 | 4/2023 | Aljabri et al. |
| 2023/0243959 A1 | 8/2023 | Donderici |
| 2023/0306578 A1 | 9/2023 | Pickerd et al. |
| 2024/0061072 A1 | 2/2024 | Kaneider et al. |
| 2024/0068951 A1 | 2/2024 | Wang et al. |
| 2024/0134007 A1 | 4/2024 | Feng et al. |
| 2024/0184306 A1 | 6/2024 | Asmari et al. |
| 2024/0210552 A1 | 6/2024 | Kiyoshi et al. |
| 2024/0302523 A1 | 9/2024 | Blaunstein et al. |
| 2024/0331127 A1 | 10/2024 | Ma et al. |
| 2025/0116535 A1 | 4/2025 | Berchtold-Buschle et al. |
| 2025/0138182 A1 | 5/2025 | Lehner et al. |

OTHER PUBLICATIONS

Hou et al. "Improved Mask R-CNN with distance guided intersection over union for GPR signature detection and segmentation", Automation in Construction, vol. 121, Jan. 2021 (Year: 2021). 14 pages.

Kontur. (2024). Air. Kontūr AS. Retrieved Oct. 6, 2025, from https://cdn.sanity.io/files/6s4an91f/production/77fe6d684301ee0f62891c1d3968a434d9d0671b.pdf, 2 pages.

Kontur. (2024). Deep. Kontūr AS. Retrieved Oct. 6, 2025, from https://cdn.sanity.io/files/6s4an91f/production/934b1f9d2c012b40dd2a56b6514589aaeeeddb6b.pdf, 2 pages.

Kontur. (2024). Ground. Kontūr AS. Retrieved Oct. 6, 2025, from https://cdn.sanity.io/files/6s4an91f/production/751277698fcb732419a1512aa148029ec47c69a1.pdf, 2 pages.

Kontur. (2024). Sensors. Kontūr AS. Retrieved Oct. 7, 2025, from https://www.kontur.tech/sensors, 7 pages.

Sun, H-H et al. (2021). "Compact Dual-Polarized Vivaldi Antenna with High Gain and High Polarization Purity for GPR Applications." Sensors, 21,503. 17 pages. https://doi.org/10.3390/s21020503.

Yavuz, M. E. et al. (2014). "GPR Signal Enhancement Using Sliding-Window Space-Frequency Matrices", Progress in Electromagnetic Research, vol. 145, 1-10.

Zhang, J. et al. (2024). "A Multi-Level Robust Positioning Method for Three-Dimensional Ground Penetrating Radar (3D GPR) Road Underground Imaging in Dense Urban Areas." Remote Sensing, 16(9), 1559. 21 pages. Web.Oct. 6, 2025. https://doi.org/10.3390/rs16091559.

* cited by examiner

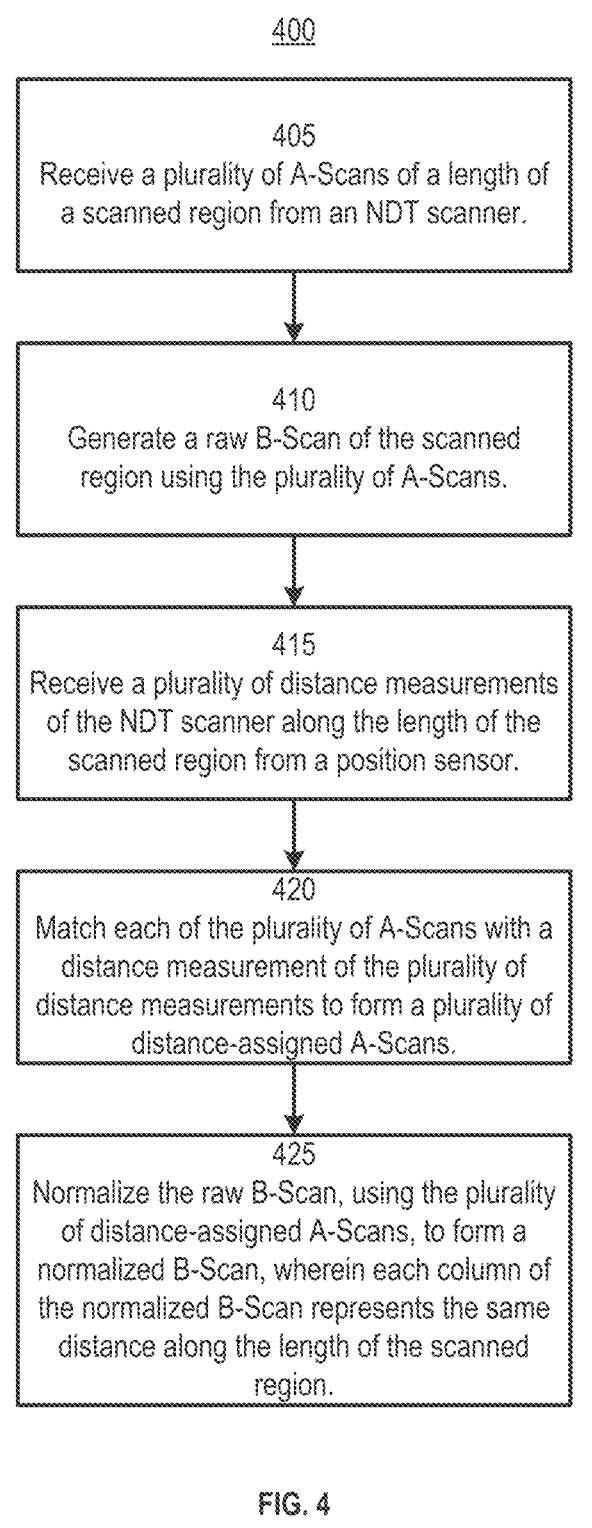

```
┌─────────────────────────────────────┐
│                 405                  │
│  Receive a plurality of A-Scans of   │
│  a length of a scanned region from   │
│           an NDT scanner.            │
└─────────────────────────────────────┘
                   │
                   ▼
┌─────────────────────────────────────┐
│                 410                  │
│   Generate a raw B-Scan of the       │
│   scanned region using the           │
│   plurality of A-Scans.              │
└─────────────────────────────────────┘
                   │
                   ▼
┌─────────────────────────────────────┐
│                 415                  │
│  Receive a plurality of distance     │
│  measurements of the NDT scanner     │
│  along the length of the scanned     │
│  region from a position sensor.      │
└─────────────────────────────────────┘
                   │
                   ▼
┌─────────────────────────────────────┐
│                 420                  │
│  Match each of the plurality of      │
│  A-Scans with a distance             │
│  measurement of the plurality of     │
│  distance measurements to form a     │
│  plurality of distance-assigned      │
│  A-Scans.                            │
└─────────────────────────────────────┘
                   │
                   ▼
┌─────────────────────────────────────┐
│                 425                  │
│  Normalize the raw B-Scan, using     │
│  the plurality of distance-assigned  │
│  A-Scans, to form a normalized       │
│  B-Scan, wherein each column of the  │
│  normalized B-Scan represents the    │
│  same distance along the length of   │
│  the scanned region.                 │
└─────────────────────────────────────┘
```

FIG. 4

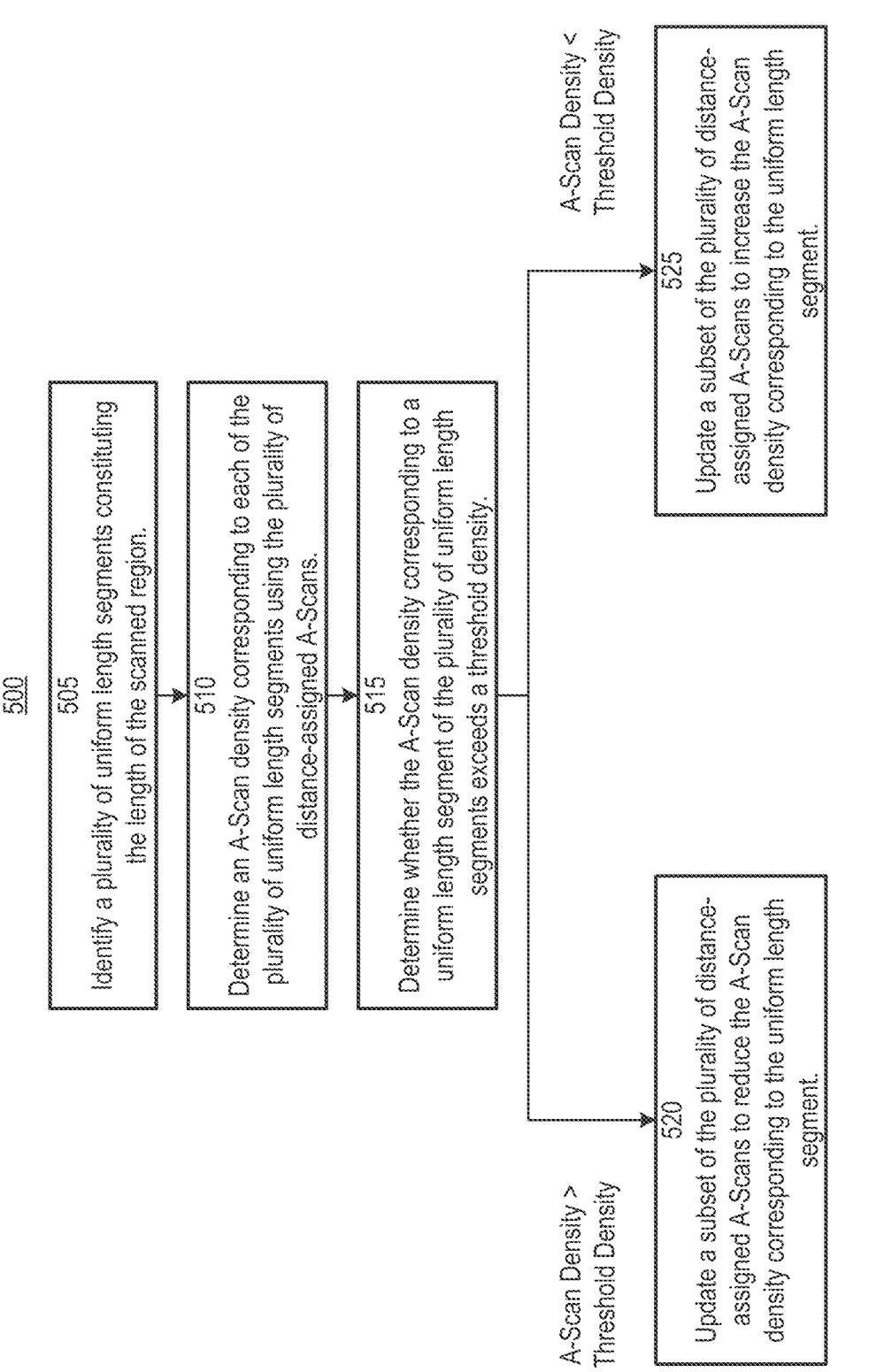

Identify a plurality of uniform length segments constituting the length of the scanned region.

510

Determine an A-Scan density corresponding to each of the plurality of uniform length segments using the plurality of distance-assigned A-Scans.

515

Determine whether the A-Scan density corresponding to a uniform length segment of the plurality of uniform length segments exceeds a threshold density.

A-Scan Density > Threshold Density

520

Update a subset of the plurality of distance-assigned A-Scans to reduce the A-Scan density corresponding to the uniform length segment.

A-Scan Density < Threshold Density

525

Update a subset of the plurality of distance-assigned A-Scans to increase the A-Scan density corresponding to the uniform length segment.

666B

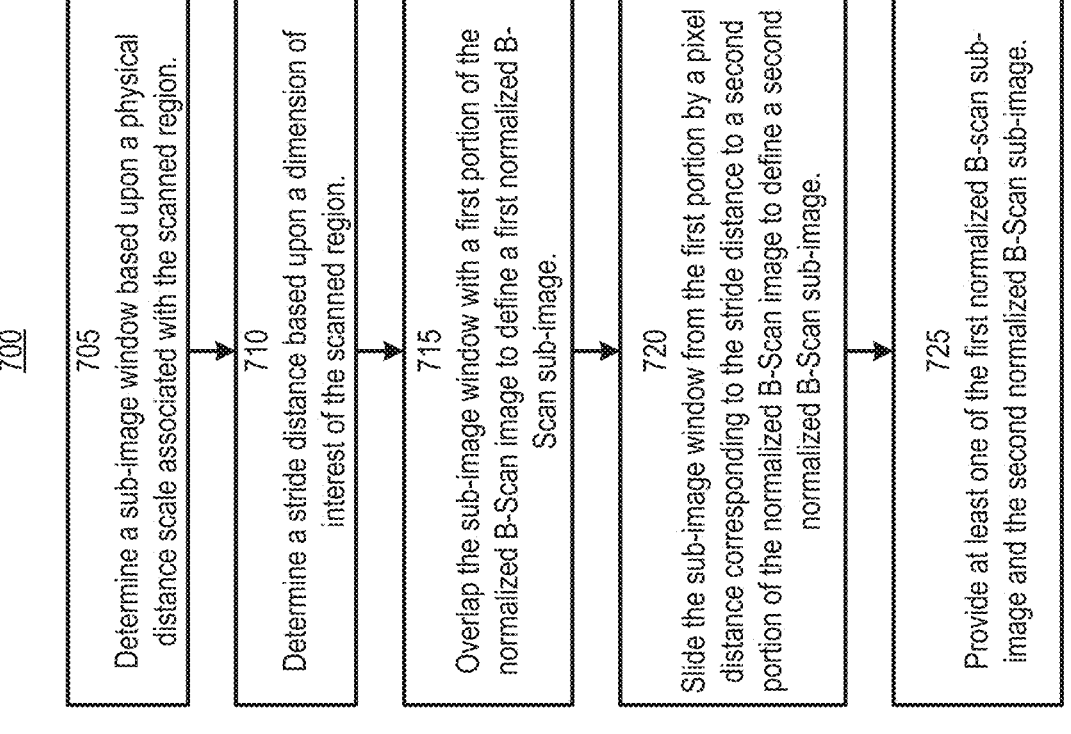

700

705
Determine a sub-image window based upon a physical distance scale associated with the scanned region.

710
Determine a stride distance based upon a dimension of interest of the scanned region.

715
Overlap the sub-image window with a first portion of the normalized B-Scan image to define a first normalized B-Scan sub-image.

720
Slide the sub-image window from the first portion by a pixel distance corresponding to the stride distance to a second portion of the normalized B-Scan image to define a second normalized B-Scan sub-image.

725
Provide at least one of the first normalized B-Scan sub-image and the second normalized B-Scan sub-image.

FIG. 7

B-SCAN NORMALIZATION FOR NON-DESTRUCTIVE TESTING

FIELD

The present disclosure relates generally to non-destructive testing, for example ground penetrating radar (GPR).

BACKGROUND

Non-destructive testing (NDT) techniques are widely employed to analyze systems without causing damage. Most forms of NDT involve transmitting a signal (e.g., an electromagnetic signal or an acoustic signal) into a region of interest, detecting the reflection of the signal, and analyzing the reflected signal to extract information about the region. Examples of NDT include ultrasonic testing, radar testing, and eddy current testing.

SUMMARY

Systems, methods, and non-transitory computer readable storage media for normalizing and slicing NDT B-Scans are described.

An example implementation of the subject matter described within this disclosure is a method including the following features. A plurality of A-Scans of a length of a scanned region can be received from a non-destructive testing (NDT) scanner. The NDT scanner can be a ground penetrating radar (GPR) scanner or another type of NDT scanner. A raw B-Scan of the scanned region can be generated using the plurality of A-Scans. A plurality of distance measurements of the NDT scanner along the length of the scanned region can be received from a position sensor coupled to the NDT scanner. The position sensor can be an inertial measurement unit (IMU) or another type of position sensor. Each of the plurality of A-Scans can be matched with a distance measurement of the plurality of distance measurements to form a plurality of distance-assigned A-Scans. The raw B-Scan can then be normalized, using the plurality of distance-assigned A-Scans, to form a normalized B-Scan. Each column of the normalized B-Scan can represent the same distance along the length of the scanned region.

The described method can be implemented in a variety of ways. For example, the method can be implemented within a system that includes at least one processor and a non-transitory memory storing instructions for the processor to perform aspects of the method. Alternatively, or in addition, the method can be included in non-transitory computer readable memory storing the method as instructions which, when executed by at least one data processor forming part of at least one computing system, causes the at least one data processor to perform operations of the method.

In some implementations, normalizing the raw B-Scan can include identifying a plurality of uniform length segments constituting the length of the scanned region and determining an A-Scan density corresponding to each of the plurality of uniform length segments using the plurality of distance-assigned A-Scans. In some implementations, normalizing the raw B-Scan further includes determining that the A-Scan density corresponding to a first uniform length segment of the plurality of uniform length segments exceeds a first threshold density and updating a first subset of the plurality of distance-assigned A-Scans to reduce the A-Scan density corresponding to the first uniform length segment. Updating the first subset of the plurality of distance-assigned A-Scans can include down-sampling the first subset to form a down-sampled subset of distance-assigned A-Scans corresponding to the first uniform length segment. In some implementations, updating the first subset of the plurality of distance-assigned A-Scans includes averaging the first subset to form an averaged subset of distance-assigned A-Scans corresponding to the first uniform length segment.

In some implementations, normalizing the raw B-Scan further includes determining that the A-Scan density corresponding to a second uniform length segment of the plurality of uniform length segments is less than a second threshold density and updating a second subset of the plurality of distance-assigned A-Scans to increase the A-Scan density corresponding to the second uniform length segment. Updating the second subset of the plurality of distance-assigned A-Scans can include generating, using a computational model, one or more synthetic distance-assigned A-Scans corresponding to the second uniform length segment and updating the second subset of the plurality of distance-assigned A-Scans to include the one or more synthetic distance-assigned A-Scans.

In some implementations, the computational model includes a linear interpolation model or a spline interpolation model. In some implementations, the computational model includes a machine learning model. The machine learning model can include a generative adversarial network.

In some implementations, the position sensor is an inertial measurement unit (IMU). In some implementations, the NDT scanner is a ground-penetrating radar (GPR) scanner.

In some aspects, the techniques described herein relate to a system including: at least one processor; and non-transitory memory storing instructions that, when executed by the at least one processor, cause the at least one processor to perform operations including: receiving, from a non-destructive testing (NDT) scanner, a plurality A-Scans of a length of a scanned region; generating a raw B-Scan of the scanned region using the plurality of A-Scans; receiving, from a position sensor coupled to the NDT scanner, a plurality of distance measurements of the NDT scanner along the length of the scanned region; matching each of the plurality of A-Scans with a distance measurement of the plurality of distance measurements to form a plurality of distance-assigned A-Scans; and normalizing the raw B-Scan, using the plurality of distance-assigned A-Scans, to form a normalized B-Scan, wherein each column of the normalized B-Scan represents the same distance along the length of the scanned region.

BRIEF DESCRIPTION OF THE FIGURES

The patent or application file contains at least one drawing executed in color. Copies of this patent or patent application publication with color drawing(s) will be provided by the Office upon request and payment of the necessary fee.

The disclosed subject matter will be more readily understood from the following detailed description in conjunction with the accompanying drawings, in which:

FIG. 4 shows a flowchart illustrating an example method of normalizing a B-Scan;

FIG. 5 shows a flowchart illustrating an example method of updating subsets of A-Scans for a B-Scan to increase or decrease the A-Scan density for a given spatial region;

FIG. 7 shows a flowchart illustrating an example method of slicing a normalized B-Scan image into normalized B-Scan sub-images.

DETAILED DESCRIPTION

Figure 1:
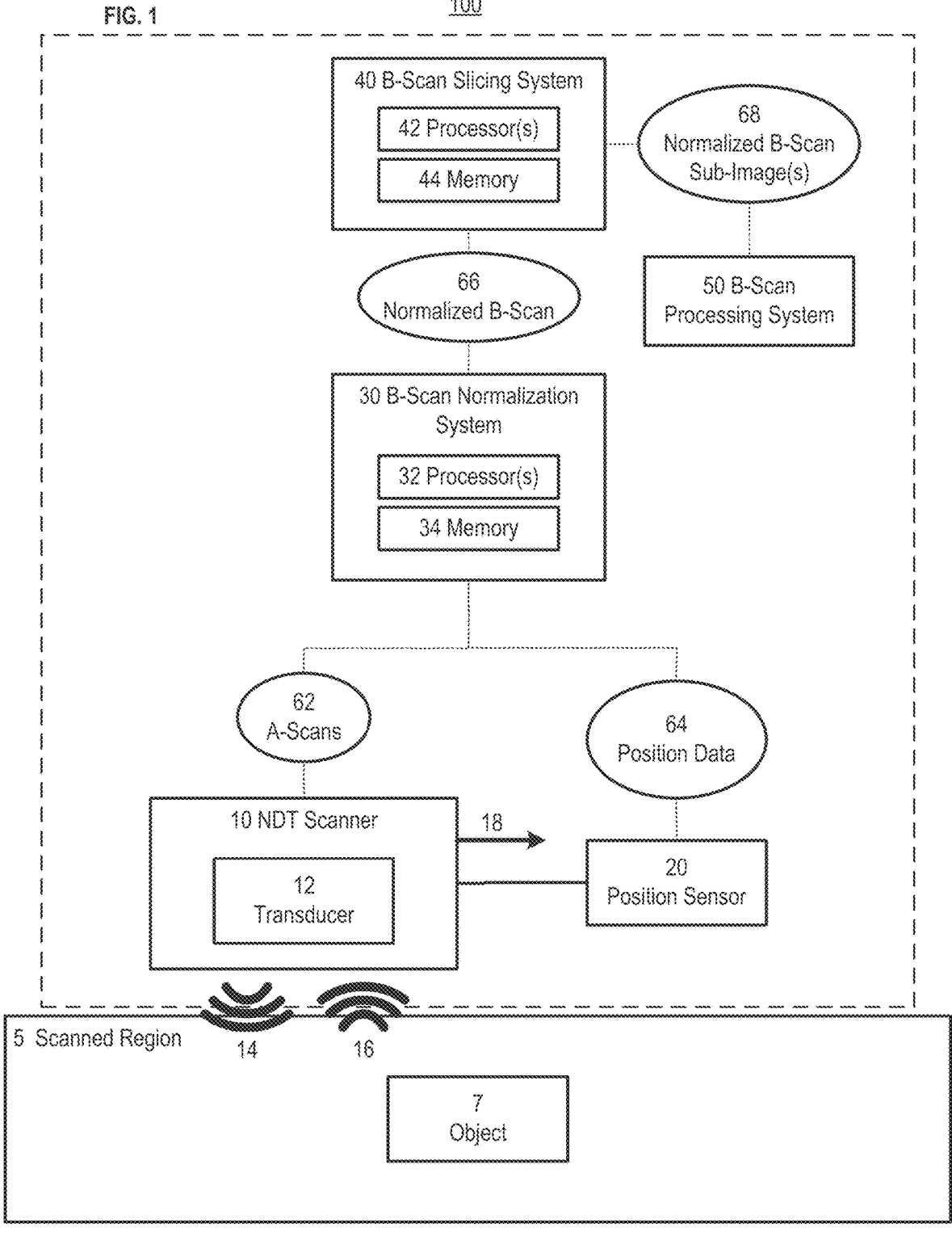
FIG. 1 shows a block diagram of an example non-destructive testing system.

Non-destructive testing (NDT) techniques can be leveraged to produce images of target regions that cannot be directly visually inspected (e.g., subsurface regions located beneath the ground surface). These images, known as B-Scans, can be automatically or semi-automatically processed to identify and localize features of interest contained in a scanned region. Variations in the speed at which an NDT scanner is moved over a scanned region, however, can result in distorted B-Scan images. Such distortions can significantly limit the ability of both human automated analysts (e.g., artificial intelligence-based analysts) to efficiently and accurately detect and pinpoint features of interest.

In addition to distortions caused by uneven or inconsistent scanner motion, B-Scans can vary significantly in size. Automated image processing tools (e.g., machine learning models) are generally only capable of accepting inputs of a particular size. B-Scans that exceed the input size requirements for a given processing tool are typically downscaled, substantially reducing their resolution and, as a result, diminishing the accuracy of the results provided by the automated processing tool.

Described herein are techniques for normalizing and slicing NDT B-Scan images to eliminate speed-related distortions and produce uniformly sized B-Scans that are suitable for processing. The techniques leverage measurements of distance traveled by an NDT scanner, provided by a position sensor coupled to the NDT scanner, to redistribute raw B-Scan data onto a uniform physical distance axis. Following normalization, the distance measurements for the NDT scanner are again applied to divide the normalized B-Scan into fixed size sub-images without loss of vital information indicative of features of interest.

Certain implementations will now be described to provide an overall understanding of the principles of the structure, function, manufacture, and use of the devices and methods disclosed herein. One or more examples of these implementations are illustrated in the accompanying drawings. Those skilled in the art will understand that the devices and methods specifically described herein and illustrated in the accompanying drawings are non-limiting implementations and that the scope of the present invention is defined solely by the claims. The features illustrated or described in connection with one implementation may be combined with the features of other implementations. Such modifications and variations are intended to be included within the scope of the present invention.

Further, in the present disclosure, like-named components of the implementations generally have similar features, and thus within a particular implementation each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

A block diagram of an exemplary NDT system 100 is illustrated in FIG. 1. In the illustrated implementation, the system 100 includes a NDT scanner 10, a position sensor 20, a B-Scan normalization system 30, a B-Scan resizing system 40, and a B-Scan processing system 50. The system 100 can be used to analyze NDT data associated with a region 5 that is scanned by the NDT scanner 10, for example, to determine a location of an object of interest contained in the region 5.

The scanned region 5 can be any land region, for example a region of a field, a region of a desert, a region of a city or a suburb (e.g., a city block), a region of an archaeological site (e.g., a cemetery), a region of a glacier, or the like. In some implementations, the scanned region 5 can be an underwater region, for example a region of an ocean floor or a region of a riverbed or a lakebed. In some implementations, the scanned region 5 can be a region that is not located on Earth, for example a region of another planet (e.g., Mars) or a region of a moon (e.g., a region of Earth's Moon, a region of a moon of Jupiter, etc.). The extent of the scanned region 5 (in any direction) can vary depending on the purpose of the NDT scan. The scanned region 5 can be composed of any material or combination of materials, and its material composition can be non-uniform. Example materials that can be present in the scanned region 5 include (but are not limited to) soil, clay, sand, granite, limestone, ice, water, concrete, metals, asphalt, basalt, shale, loam, silt, peat, permafrost, brick, plastic fiberglass, gravel, and/or regolith.

The scanned region 5 can contain an object 7. The object 7 can be a single object or multiple objects. The object 7 can be any item situated (e.g., buried) in the subsurface of the scanned region 7. For example, the object 7 can be a deposit of a particular element, alloy, or metal (e.g., a gold deposit), an environmental or geologic feature (e.g., a void, a tree root, etc.), a piece of infrastructure (e.g., a utility line, a pipe, a tunnel, a sewer line, a storm drain, etc.), an archaeological feature or artifact (e.g., a tool, a portion of a building, buried remains, etc.), or an object of military interest (e.g., an explosive device such as a mine).

The NDT scanner 10 can be any NDT scanning device or apparatus for which reflected signals produce hyperbolic patterns. In some implementations, the NDT scanner 10 can be a ground penetrating radar (GPR) scanner. In some implementations, the NDT scanner 10 can be an air-coupled GPR system. In some implementations, the NDT scanner 10 can be an ultrasonic testing (UT) scanner. In some implementations, the NDT scanner 10 can be a seismic reflection imaging system. In some implementations, the NDT scanner 10 can be an acoustic tomography system.

As shown in FIG. 1, the NDT scanner 10 can include a transducer 12. The transducer 12 can be any suitable device or combination of devices configured to emit signals 14 (e.g., a radar signal, an ultrasound signal, etc.) into the scanned region 5 and to detect signals 16 that are reflected by the scanned region 5. For example, if the NDT scanner 10 is a GPR scanner, the transducer 12 can include a radar antenna. Similarly, if the NDT scanner is a UT scanner, the transducer 12 can include an ultrasonic transducer.

The signals 14 emitted by the transducer 12 can be pulsed signals, continuous wave signals, or a combination thereof. The transducer 12 can be configured to detect the reflected signals 16 with sufficient resolution to identify subsurface reflection patterns. In some implementations, the transducer 12 includes both a signal transmitter and a signal receiver. In some implementations, the transducer 12 includes a single device used in a pulsed (monostatic) configuration or a single device used in a bistatic configuration (e.g., a transmitter and a receiver that are spatially separated).

The NDT scanner 10 can be configured to be moved along a surface of the scanned region 5, e.g., as indicated by arrow 18 in FIG. 1. In some implementations, the NDT scanner 10 can be configured to be moved manually, for example by being pushed or pulled by a user. In some implementations, the NDT 10 can be configured to be moved by a motor. For example, the NDT scanner 10 can be coupled to a motorized vehicle or robot that is configured to move the NDT scanner 10 along the surface of the scanned region 5.

As the NDT scanner 10 is moved over the scanned region 5, the NDT scanner 10 can be configured to generate a set of A-Scans 62 for the scanned region. Each A-Scan 62 is a one-dimensional time-series trace of echo amplitude. Each A-Scan 62 can include data indicating an intensity of a reflected signal 16 received by the transducer 12. The A-Scans 62 can be generated by a computer system of the NDT scanner 10.

The computer system of the NDT scanner 10 can be configured to timestamp each A-Scan of the set of A-Scans 62, that is, to associate each A-Scan of the set of A-Scans 62 with a time measurement. In some embodiments, the time measurement can be a time of day (e.g., 12:00:00, 12:00:30, 12:01:00, etc.). In some embodiments, the time measurement can be an amount of time following initiation of scanning by the NDT scanner 10 (e.g., 0 seconds, 1 second, 2 seconds, 5 seconds, etc.).

The position sensor 20 can be coupled to the NDT scanner 10. The position sensor 20 can include any device or combination of devices configured to detect motion of the NDT scanner 10 and generate distance data 64 that encodes a position of or distance traveled by the NDT scanner 10 over the scanned region 5 as a function of time. In some implementations, the position sensor 20 can include an inertial measurement unit (IMU), a global navigation satellite system (GNSS) unit, a wheel encoder, or another suitable motion sensing or position sensing device. The position sensor 20 can be contained in the NDT scanner 10 (e.g., contained in a main housing of the NDT scanner 10 that also contains the transducer 12) or can be connected to a component of the NDT scanner 10 (e.g., connected to a handle or a wheel of the NDT scanner 10). As described in further detail herein, the time stamps of data of the distance data 64 can be synchronized with the timestamps of the A-Scans 62 to determine the relative (or, if the distance data 64 includes data acquired from GNSS, the absolute) position of each A-Scan 62.

The speed at which the NDT scanner 10 moves along a given track or path over the scanned region 5 can vary due to, e.g., topological or other physical variations in the surface of the scanned region 5. For example, the speed at which the NDT scanner 10 moves over steep portions (e.g., portions with an incline grade that exceeds 30%) of the scanned region 5 may be lower than the speed at which the NDT scanner 10 moves over shallower portions (e.g., portions with an incline grade less than 30%) of the scanned region 5.

Figure 2:
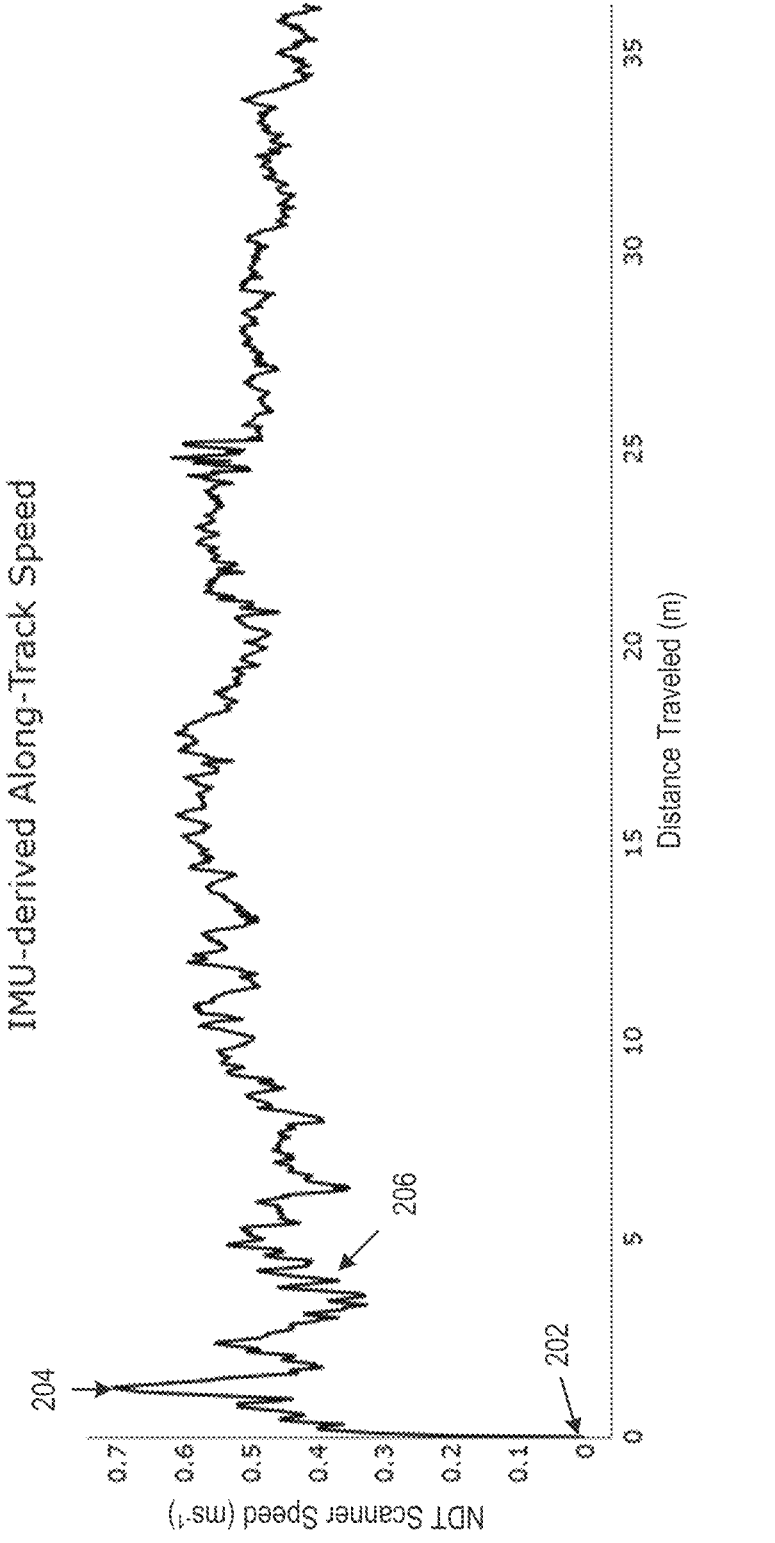
FIG. 2 shows a plot of example along-track speed data for a non-destructive testing scanner.

Example data showing the variation in speed of an example NDT scanner as the NDT scanner was moved along a track over a scanned region, derived from an IMU coupled to the scanner, is plotted in FIG. 2. In this example, the NDT scanner accelerated from its starting position (plot point 202) and reached a peak speed of approximately 0.7 m s$^{-1}$ after travelling approximately 2 m (plot point 204). By the time the NDT scanner had traveled 5 m, the scanner's speed had slowed to approximately 0.4 m s$^{-1}$ (plot point 206). Between approximately 5 m and approximately 35 m from its starting position, the NDT scanner's speed varied between approximately 0.3 m s$^{-1}$ and approximately 0.6 m s$^{-1}$.

Referring again to FIG. 1, if the speed at which the NDT scanner 10 travels over the scanned region 5 varies, the number of reflected signals 16 detected (and, therefore, the number of A-Scans generated) in portions of the scanned region 5 over which the NDT scanner 10 moves at a slower speed can differ from the number of reflected signals 16 detected (and, therefore, the number of A-Scans generated) in portions of the scanned region 5 over which the NDT scanner 10 moves at a faster speed. As a result, a higher density of A-Scans (that is, a greater number of A-Scans per unit length) may be produced by the NDT scanner 10 for portions of the scanned region 5 over which the NDT scanner 10 moves relatively slowly. Likewise, a lower density of A-Scans (that is, a lesser number of A-Scans per unit length) may be produced by the NDT scanner 10 for portions of the scanned region over which the NDT scanner 10 moves relatively quickly.

Figure 3A:
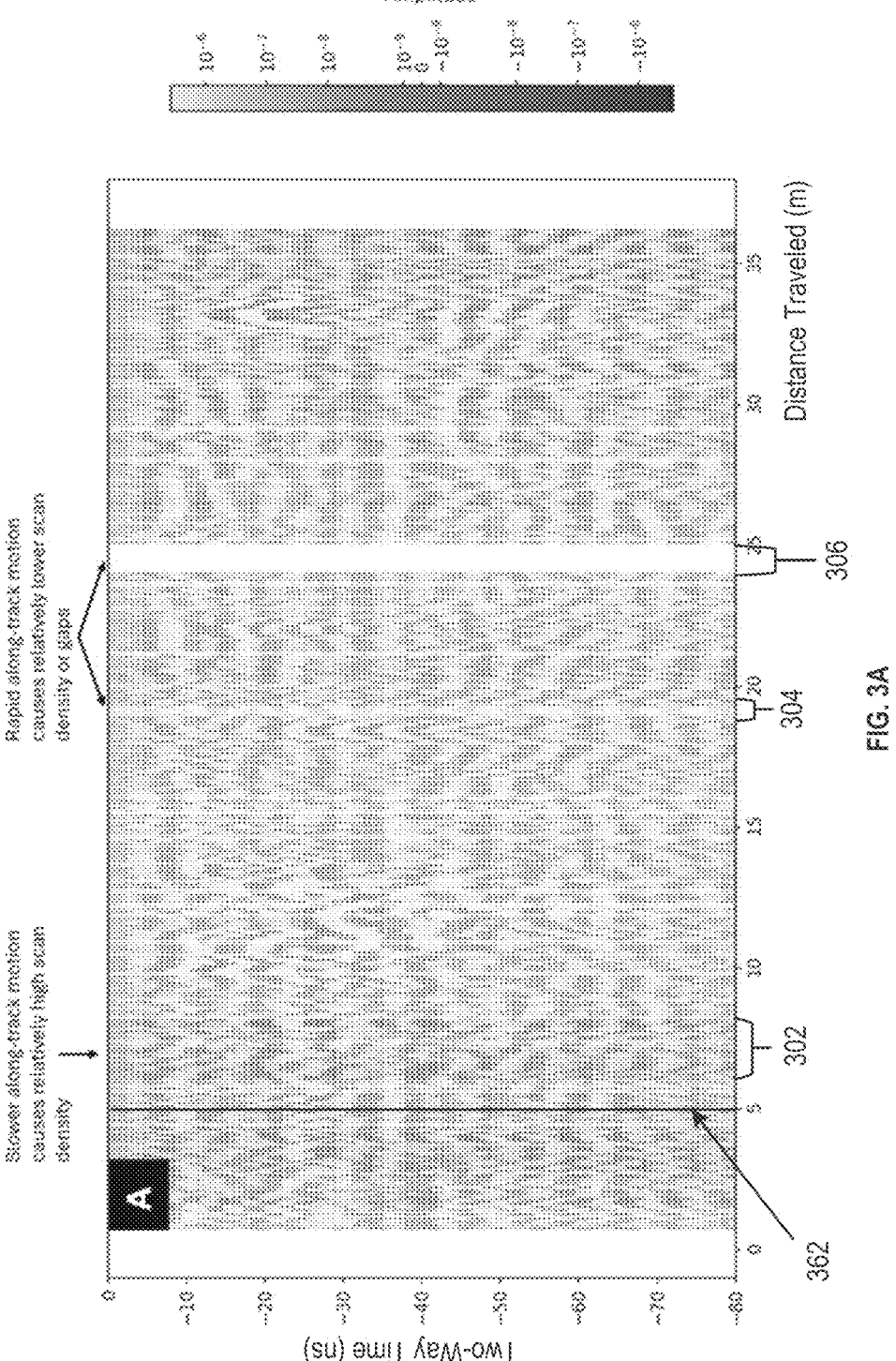
FIG. 3A shows an example set of A-Scans that have been arranged sequentially in pixel space with no correction for true position.

An example set of A-Scans produced by an example NDT scanner for a scanned region is shown in FIG. 3A. In FIG. 3A, each vertical line is an A-Scan produced for a given location along the track traveled by the NDT scanner over the scanned region. For example, the solid vertical line 362 covers an A-Scan produced at a location situated at a distance of 5 m along the track traveled by the NDT scanner over the scanned region.

In this example, the NDT scanner traveled at a relatively low speed over the portion of the scanned region situated between a distance of approximately 6 m and approximately 8 m along the track traveled by the NDT scanner. The NDT scanner's relatively slow along-track motion over this portion of the scanned region resulted in the NDT scanner producing a larger number of A-Scans (subset 302 of the A-Scans). for that portion of the scanned region. In other words, the density of A-Scans produced for the portion of the scanned region situated between approximately 6 m and approximately 8 m from the scanner's starting position was high relative to the density of A-Scans produced for other portions of the scanned region. Contrastingly, the NDT scanner traveled at a relatively high speed over the portion of the scanned region situated between a distance of approximately 18 m and approximately 19 m along the track traveled by the NDT scanner, resulting in the NDT scanner producing a smaller number of A-Scans (subset 304) for that portion of the scanned region. Over the portion of the scanned region situated between a distance of approximately 24 m and approximately 25 m along the track traveled by the NDT scanner, the NDT scanner's speed was high enough that the NDT scanner produced no A-Scans (subset 306).

Sets of A-Scans (e.g., the A-Scans 62 shown in FIG. 1) produced for a scanned region (e.g., the scanned region 5 shown in FIG. 1), can be arranged sequentially in pixel space, based upon their respective time stamps, to form an image, referred to herein as a "raw B-Scan image," of the scanned region. In a raw B-Scan image, sequential A-Scans may be positioned in pixel space directly adjacent to one another, regardless of the actual spatial separation distance between the portions of the scanned region corresponding to each A-Scan.

Figure 3B:
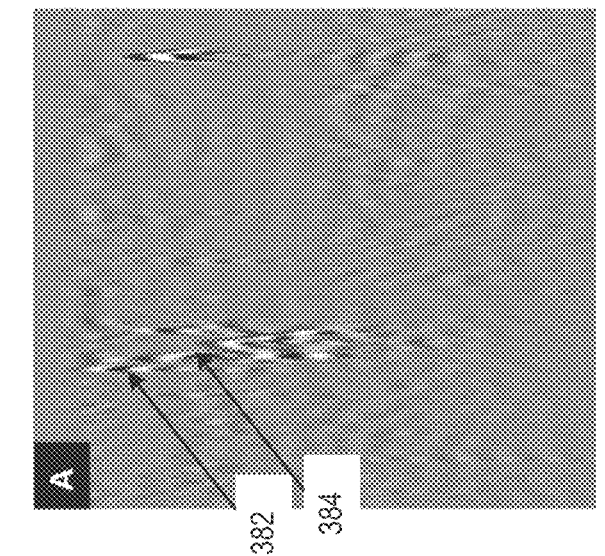
FIG. 3B shows an example raw B-Scan image.

FIG. 3B shows an example raw B-Scan 380 formed by arranging a set of A-scans sequentially in pixel space with no correction for the true position in the scanned region to which each A-Scan corresponds. As shown, the raw B-Scan 380 includes various potential features of interest, including feature 382 and feature 384. The simple sequential arrangement of the A-Scans in the raw B-Scan 380 suggests that feature 382 and feature 384 are located close to one another in the scanned region. In reality, however, the A-Scan(s) containing feature 382 may correspond to a portion of the scanned region that is spatially separated from the portion of the scanned region to which the A-Scan(s) containing feature 384. In other words, the apparent proximity of the features 382 and 384 in the raw B-Scan 380 results from plotting consecutive A-Scans at unit pixel spacing, regardless of the actual along-track distance between successive acquisitions, which can compress or stretch physical space in the raster. This spatial distortion arises due to non-uniform NDT scanner velocity and the absence of spatial resampling.

In addition to lacking information about true A-Scan position, raw B-Scan images can be formed from a set of A-Scans that varies in density for different portions of a scanned region can be distorted. Specifically, a B-Scan image formed from a set of A-Scans that varies in density can be comprised of columns of pixels that each represent different-sized portions of the scanned region. For example, such a B-Scan image can include one column of pixels that represents a one-meter-long portion of the scanned region and another column of pixels that represents a five-meter-long portion of the scanned region. As a result of such distortions, information of interest (e.g., information indicative of the presence of an object of interest) may be obscured or erased, while information not of interest (e.g., noise) may be amplified. Such uneven column-to-distance mapping can make quantitative localization of subsurface reflectors impossible. Additionally, such distortions can inhibit the application of computational processing and analysis techniques to analyze B-Scan images. For example, such distortions can degrade the performance of machine learning models (e.g., machine learning models configured to identify and estimate the depth of objects in B-Scans such as those described in U.S. patent application Ser. No. 19/200, 159, filed May 6, 2025 and entitled "Automated Depth Estimation for Non-Destructive Testing," the entire contents of which are hereby incorporated herein by reference) because the same physical feature may appear at different scales across samples.

Referring again to FIG. 1, the NDT scanner 10 and the position sensor 20 can be communicatively coupled to the B-Scan normalization system 30. As explained in further detail herein, the B-scan normalization system 30 can be configured to mitigate loss of information and amplification of noise by generating, using the A-Scans 62 produced by the NDT scanner 10 and the distance data 64 produced by the position sensor 20, a normalized B-Scan image 66. In the normalized B-Scan image 66, the A-Scans can be arranged according to the actual locations in the scanned region to which they correspond, and the lengths of the portions of the scanned region 5 represented by each column of pixels can be the same.

As shown in FIG. 1, the B-Scan normalization system 30 can be any suitable device or combination of devices that includes at least one data processor 32 and memory 34 storing instructions configured to cause the processor(s) 32 to perform operations. For example, the B-Scan normalization system 30 can be or include a server, a desktop computer, a laptop computer, a tablet, a smart phone, an application-specific integrated circuit (ASIC), a field programmable gate array (FPGA), or a combination thereof. The processor(s) 32 can include any processor suitable for the execution of a computer program. For example, the processor(s) 32 can include a central processing unit (CPU), a graphics processing unit (GPU), a general-purpose microprocessor, or a special-purpose microprocessor, or a combination thereof. Memory 34 can include read-only memory (ROM), random access memory (RAM), an optical disk (e.g., a CD), a flash memory device, a removable hard drive, an internal hard disk, and/or the like.

An exemplary method 400 for generating a normalized B-Scan image for a region scanned by an NDT scanner is provided in FIG. 4. The method 400 can be performed, all or in part, by a processor of a computer system, for example the processor 32 of the system 30 shown in FIG. 1, using instructions stored by a memory of the computer system, for example the memory 34 of the system 30 shown in FIG. 1.

The method 400 is intended only as an example implementation of a method of generating a normalized B-Scan image of a scanned region. In some implementations, a method of generating a normalized B-Scan image of a scanned region can be performed in a different order than the method 400 of FIG. 4. In some implementations, a method of generating a normalized B-Scan image of a scanned region can include aspects in addition to those of the method 400 of FIG. 4, and in some implementations, a method of generating a normalized B-Scan image of a scanned region can omit aspects of the method 400 of FIG. 4.

At 405, a plurality of A-Scans (e.g., the A-Scans 62 show in FIG. 1) of a length of a scanned region (e.g., the scanned region 5 shown in FIG. 1) can be received from an NDT scanner (e.g., the NDT scanner 10 shown in FIG. 1). The plurality of A-Scans can include at least 5, at least 10, at least 20, at least 30, at least 40, at least 50, at least 100, at least 200, at least 500, at least 1000, at least 10,000, at least 50,000, or at least 100,000 A-Scans.

Each A-Scan of the plurality of A-Scans can be timestamped, that is, each A-Scan of the plurality of A-Scans can be associated with time measurement. In some embodiments, the time measurement can be a time of day (e.g., 12:00:00, 12:00:30, 12:01:00, etc.). In some embodiments, the time measurement can be an amount of time following initiation of scanning by the NDT scanner (e.g., 0 seconds, 1 second, 2 seconds, 5 seconds, etc.).

At 410, the plurality of A-Scans can be used to generate a raw B-Scan image of the scanned region. The raw B-Scan image can be formed by arranging the A-Scans according to their respective timestamps. Successive A-scans can be arranged as adjacent columns in a 2D array whose rows represent sample index (proportional to two-way time). No spatial resampling is performed, so the horizontal axis of the array of A-Scans implicitly represents the acquisition index of the A-Scans. The array of A-Scans can then be rendered as a grayscale or false-color image wherein pixel intensity encodes signal amplitude.

At 415, a plurality of distance measurements (e.g., the distance data 64 shown in FIG. 1) of the NDT scanner can be received from a position sensor (e.g., the position sensor 20 shown in FIG. 1). Like the plurality of A-Scans, each distance measurement of the plurality of distance measurements can be timestamped, that is, each distance measurement of the plurality of distance measurements can be associated with a time measurement. In some embodiments, the time measurement can be a time of day (e.g., 12:00:00, 12:00:30, 12:01:00, etc.). In some embodiments, the time measurement can be an amount of time following initiation of scanning by the NDT scanner (e.g., 0 seconds, 1 second, 2 seconds, 5 seconds, etc.).

At 420, each A-Scan of the plurality of A-Scans can be matched to a distance measurement of the plurality of distance measurements to form a plurality of distance-assigned A-Scans. The A-Scans and the distance measurements can be matched by identifying A-Scan(s) and distance measurement(s) that share the same timestamp. An A-Scan $A_1$ with a timestamp of $t_1$, for example, can be matched to a distance measurement $D_1$ with the timestamp $t_1$ to form an A-Scan, distance measurement pair (the "distance-assigned" $A_1$) ($A_1$, $D_1$).

At 425, using the plurality of distance-assigned A-Scans, the raw B-Scan image generated at 410 can be normalized to form a normalized B-Scan image. In the normalized B-Scan image, each column can represent the same distance traveled by the NDT scanner along the length of the scanned region. For example, in the normalized B-Scan image, each column may represent a travel distance of 0.1 m, 0.25 m, 0.5 m, 0.75 m, 1 m, or another travel distance.

Normalizing the raw B-Scan image to form the normalized B-Scan image at 425 can involve updating one or more subsets of the plurality of A-Scans to increase or decrease the density of A-Scans in the subsets. FIG. 5 provides an example method 500 for updating subsets of A-Scans to increase or decrease the A-Scan density. The method 500 can be performed, all or in part, by a processor of a computer system, for example the processor 32 of the system 30 shown in FIG. 1, using instructions stored by a memory of the computer system, for example the memory 34 of the system 30 shown in FIG. 1.

The method 500 is intended only as an example implementation of a method of updating subsets of A-Scans to increase or decrease the A-Scan density. In some implementations, a method of updating subsets of A-Scans to increase or decrease the A-Scan density can be performed in a different order than the method 500 of FIG. 5. In some implementations, a method of updating subsets of A-Scans to increase or decrease the A-Scan density can include aspects in addition to those of the method 500 of FIG. 5, and in some implementations, a method of updating subsets of A-Scans to increase or decrease the A-Scan density can omit aspects of the method 500 of FIG. 5.

At 505, a plurality of uniform length segments that constitute the total length of the scanned region can be identified. A number of A-Scans of the plurality of A-Scans corresponding to each of these length segments (that is, the A-Scan density for each length segment) can then be determined (510). For each uniform length segment, a determination as to whether the A-Scan density corresponding to the length segment exceeds a threshold A-Scan density can be made (515).

If the A-Scan density corresponding to a given uniform length segment exceeds the threshold density, a subset of the plurality of distance-assigned A-Scans corresponding to that length segment can be updated to reduce the A-Scan density corresponding to the length segment (520). Updating the subset of distance-assigned A-Scans to reduce the subset's A-Scan density can be accomplished through any suitable technique. For example, the subset of distance-assigned A-Scans can be averaged to form an average subset of distance-assigned A-Scans or downsampled to form a downsampled subset of distance-assigned A-Scans. Example techniques that can be used to reduce the A-Scan density in a given length segment include (but are not limited to) moving-window mean or median filtering, decimation after low-pass filtering, Gaussian resampling, Lanczos resampling, or bicubic resampling.

If the A-Scan density corresponding to a given uniform length segment is less than the threshold density, a subset of the plurality of distance-assigned A-Scans corresponding to that length segment can be updated to increase the A-Scan density corresponding to the length segment (525). Updating the subset of distance-assigned A-Scans to increase the subset's A-Scan density can be accomplished through any suitable technique. For example, a computational model can be used to generate one or more synthetic distance-assigned A-Scans corresponding to the uniform length segment. The synthesized distance-assigned A-Scans can then be added to the original subset of distance-assigned A-Scans. Any suitable computational model can be employed to synthesize distance-assigned A-Scans for the length segment. Example computational models include (but are not limited to) linear interpolation models, spline interpolation models, artificial intelligence or machine learning models (e.g., generative adversarial networks, variational autoencoders (VAEs), diffusion-based generative models, transformer-based sequence-to-sequence models trained on A-Scan tokens, etc.), or combinations thereof.

In some implementations, the threshold density above which an A-Scan subset is considered to have a high A-Scan density (the "high-density threshold") and the threshold density below which an A-Scan subset is considered to have a low A-Scan density (the "low-density threshold") may differ. In such implementations, if an A-Scan subset is determined at 520 to have an A-Scan density between the high-density threshold and the low-density threshold, the A-Scan subset may not be updated.

Figure 6A:
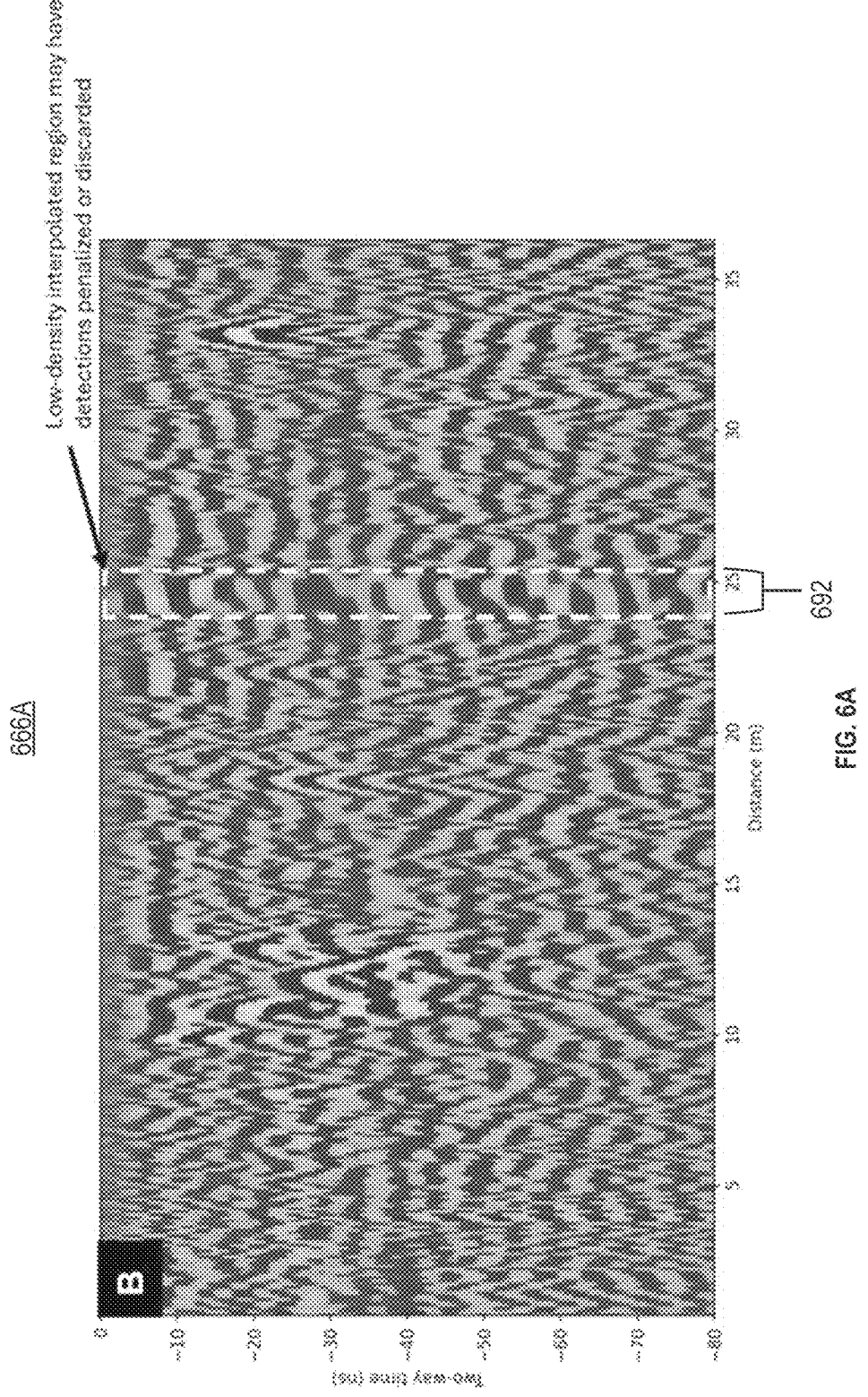
FIG. 6A shows an example normalized B-Scan image.

FIG. 6A shows an example of a normalized B-Scan image 666A generated using the set of A-Scans shown in FIG. 3A. In the normalized B-Scan image 666A, each constituent A-Scan is positioned, using position data from a position sensor, based upon the actual location of the portion of the scanned region to which the A-Scan corresponds. Portions of the normalized B-Scan image 666A having a high density of A-Scans were averaged to reduce the A-Scan density and portions of the normalized B-Scan image 666A having a low density of A-Scans (e.g., portion 692) were interpolated to increase the A-Scan density.

Figure 6B:
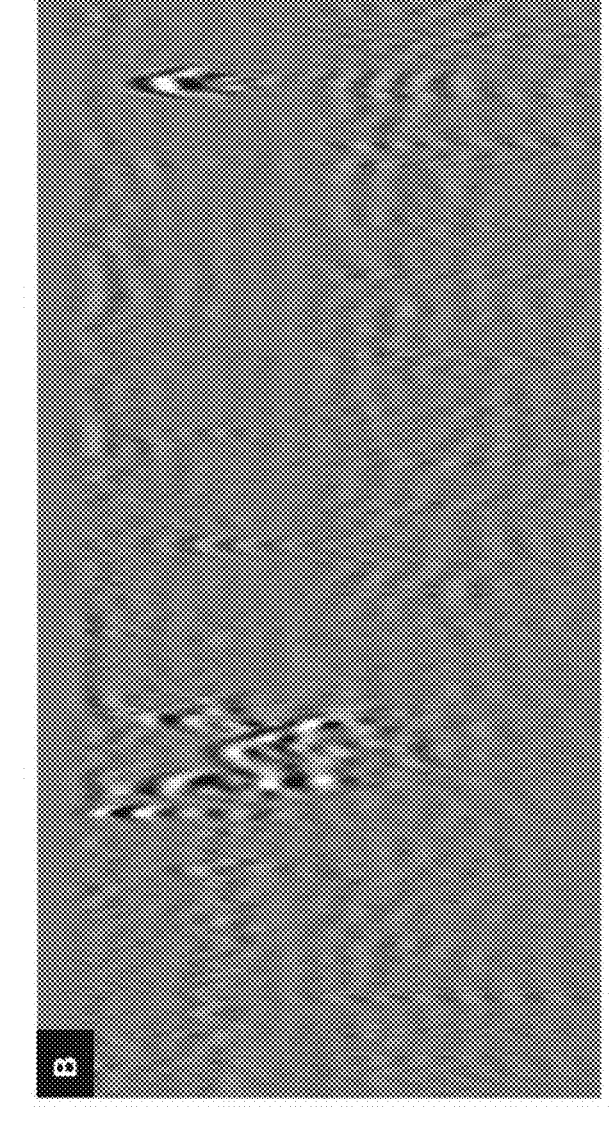
FIG. 6B shows another example B-Scan image.

Another example normalized B-Scan image 666B is shown in FIG. 6B. The normalized B-Scan image 666B was generated using the raw B-Scan image 380 (that is, the set of A-Scans that constitute the raw B-Scan image 380) shown in FIG. 3B. In the normalized B-Scan image 666b, the constituent A-scans are positioned in their true metric space based on position data from a position sensor. Portions of the normalized B-Scan image 666B having a high density of A-Scans were averaged to reduce the A-Scan density and portions of the normalized B-Scan image 666B having a low density of A-Scans were interpolated to increase the A-Scan density.

Referring again to FIG. 1, the B-Scan normalization system 30 can be communicatively coupled to the B-Scan slicing system 40. As explained in further detail herein, the B-Scan slicing system 40 can be configured to "slice" (e.g., divide) the normalized B-Scan image 66 to generate one or more normalized B-Scan sub-images 68. The normalized B-Scan sub-images 68 can be uniform in size (e.g., can each have a width of N pixels and a length of M pixels, where N and M are integers greater than zero), which can, e.g., enable the normalized B-Scan sub-images 68 to be efficiently analyzed for object identification or other NDT purposes.

As shown in FIG. 1, the B-Scan slicing system 40 can be any suitable device or combination of devices that includes at least one data processor 42 and memory 44 storing instructions configured to cause the processor(s) 42 to perform operations. For example, the B-Scan slicing system 40 can be or include a server, a desktop computer, a laptop computer, a tablet, a smart phone, an application-specific integrated circuit (ASIC), a field programmable gate array (FPGA), or a combination thereof. The processor(s) 42 can include any processor suitable for the execution of a computer program. For example, the processor(s) 42 can include a central processing unit (CPU), a graphics processing unit (GPU), a general-purpose microprocessor, or a special-purpose microprocessor, or a combination thereof. Memory 44 can include read-only memory (ROM), random access memory (RAM), an optical disk (e.g., a CD), a flash memory device, a removable hard drive, an internal hard disk, and/or the like.

An exemplary method 700 of slicing a normalized B-Scan image into one or more normalized B-Scan sub-images is provided in FIG. 7. The method 700 can be performed, all or in part, by a processor of a computer system, for example the processor 42 of the system 40 shown in FIG. 1, using instructions stored by a memory of the computer system, for example the memory 44 of the system 40 shown in FIG. 1. The method 700 can be executed using a normalized B-Scan such as the normalized B-Scan 66 shown in FIG. 1, the normalized B-Scan 666A shown in FIG. 6A, or the normalized B-Scan 666B shown in FIG. 6B.

The method 700 is intended only as an example implementation of a method of slicing a normalized B-Scan image. In some implementations, a method of slicing a normalized B-Scan image can be performed in a different order than the method 700 of FIG. 7. In some implementations, a method of slicing a normalized B-Scan image can include aspects in addition to those of the method 700 of FIG. 7, and in some implementations, a method of slicing a normalized B-Scan image can omit aspects of the method 700 of FIG. 7.

At 705, a sub-image window can be determined. The sub-image window can be data defining an pixel area having a width of M pixels and a length of N pixels, where M and N are integers greater than zero. In some implementations, determining M and N can involve identifying a physical (that is, non-digital) distance scale associated with the scanned region depicted in the B-Scan. For example, if the scanned region has a total length of 30 m, a distance scale associated with the scanned region can be 1 m. After the distance scale is identified, a number of pixels in the normalized B-Scan corresponding to the distance scale can be determined. A 1 m distance scale, for instance, may correspond to 50 pixels in the normalized B-Scan image. The sub-image window can then be determined based upon the determined number of pixels corresponding to the distance scale.

At 710, a stride distance can be a distance S can be determined based upon a dimension of interest of the scanned region. The dimension of interest can be, e.g., a smallest dimension of an object of interest that is being sought after in the scanned region. In some embodiments, the dimension of interest can be the same as the distance scale used to determine the sub-image window.

At 715, the sub-image window can be overlapped with a first portion of the normalized B-Scan image to define a first normalized B-Scan sub-image. That is, at 715, a first M×N slice of the normalized B-Scan image can be selected. Once the first normalized B-Scan sub-image is defined, the sub-image window can be slid from the first portion of the normalized B-Scan image, by a pixel distance corresponding to the stride distance, to a second portion of the normalized B-Scan image to define a second normalized B-Scan sub-image (720). In some implementations, at 720, defining the second normalized B-Scan sub-image can involve selecting a first pixel contained in the first portion of the normalized B-Scan image, identifying a second pixel that is separated from the first pixel by a pixel distance corresponding to the stride distance, and selecting a second M×N slice of the normalized B-Scan image that contains the second pixel. In other words, the sub-image window can be slid horizontally by S pixels, where S$\Delta$x equals the stride distance. In some implementations, the stride is applied in both the M direction and the N direction. In some implementations, the pixels of the B-Scan image may not be square, i.e., the vertical axis and the horizontal axis may represent different physical scales and, as a result, the stride distance may in M and N depending on the scale of the feature(s) of interest in either dimension and/or the scale of the B-Scan axes. At 725, at least one of the first normalized B-Scan sub-image and the second normalized B-Scan sub-image can be provided (e.g., output) for further analysis or processing.

While the method 700 describes the slicing of the normalized B-Scan image into two sub-images, in some implementations, following 720, normalized B-Scan sub-images in addition to the first and second sub-images can be defined by repeatedly sliding the sub-window across the normalized B-Scan image. The total number of sub-images into which a normalized B-Scan image is sliced can depend on various factors, including, e.g., the total length of the scanned region, the size of an object being sought in the scanned region, and the like. In some implementations, slicing may be performed until the entirety of the normalized B-Scan is covered in sub-images.

Figure 8:
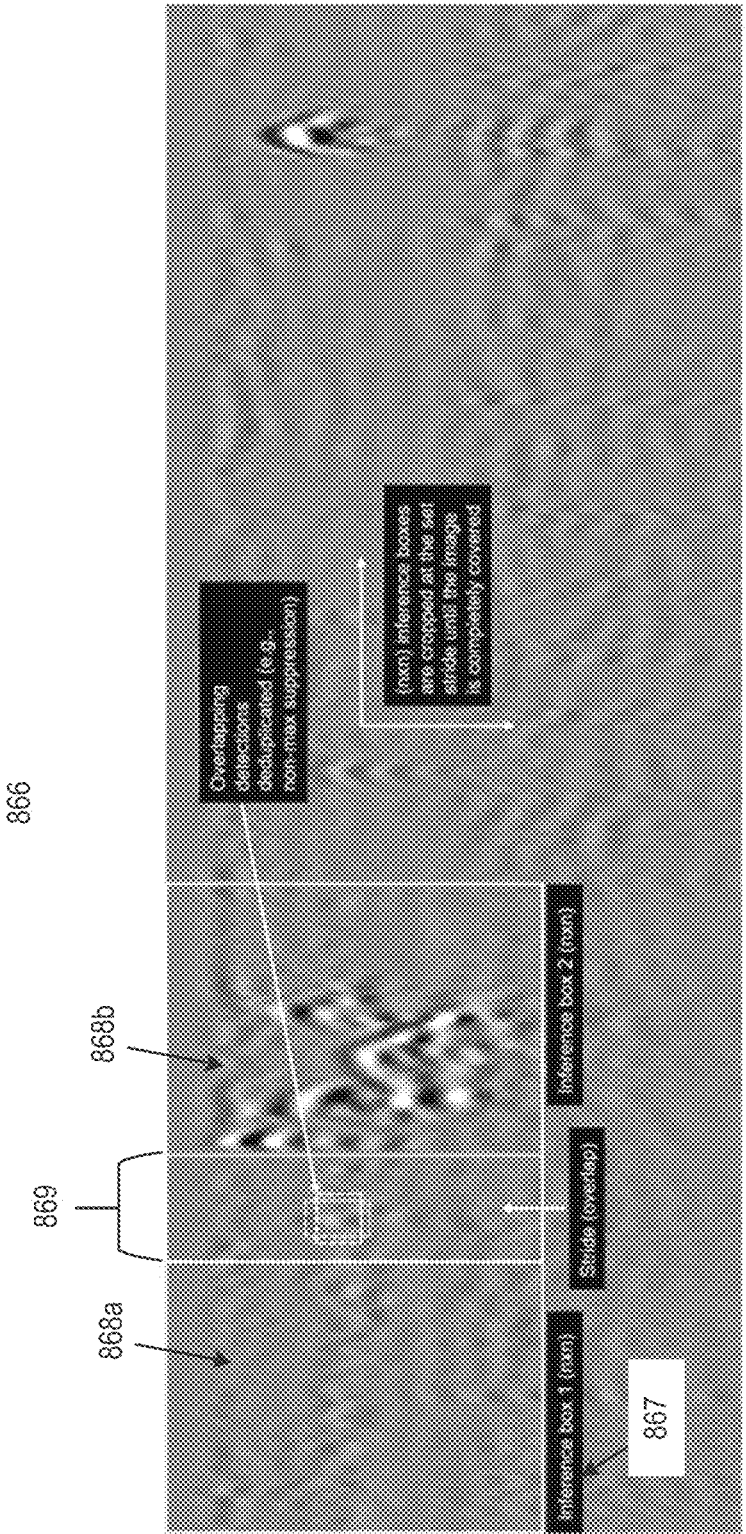
FIG. 8 shows an example normalized B-Scan image being sliced into normalized B-Scan sub-images.

FIG. 8 shows an example normalized B-Scan image 866 being sliced into normalized sub-images. In this example, a first normalized B-Scan sub-image 868a was defined by overlapping an n×n sub-image window (referred to in FIG. 8 as "interference box 1") with a first portion of the normalized B-Scan image 866. The sub-image window was then slid horizontally by a pixel distance corresponding to a predetermined stride distance to overlap with a second portion of the normalized B-Scan image 866 (the portion contained in "interference box 2") to define a second normalized B-Scan sub-image 868b.

In FIG. 8, the first normalized B-Scan sub-image 868a and the second normalized B-Scan sub-image 868b each contain a portion 869 of the normalized B-Scan image 866. Prior to providing the first normalized B-Scan sub-image 868a and the second normalized B-Scan sub-image 868b for further processing or analysis, features of interest in the overlapping portion 869 can be de-duplicated, e.g., using a technique such as non-max suppression.

In some implementations, normalization of a B-Scan may be unnecessary. For example, if the region scanned by the NDT scanner has relatively even, flat surface, the speed at which the NDT scanner moves over the surface during scanning may be sufficiently consistent so as to produce an approximately uniformly dense set of A-Scans for the scanned region. It will be apparent that B-Scan images that do not require normalization can be resized using the B-Scan slicing methods described herein, e.g., the method 800 of FIG. 8.

In some implementations, each normalized B-Scan sub-image produced using a process such as the method 700 shown in FIG. 7 can undergo a fidelity assessment to determine, e.g., whether the sub-image should be provided for further processing and analysis. In some implementations, an along-track sampling interval can be determined. In some implementations, an along-track sampling interval can be a distance in metric space between successive A-Scans based on the corrected A-Scan positions. If the along-track sampling interval exceeds a user-defined threshold, such as the minimum width of a detectable object, the interpolated area between those A-Scans is flagged as low-fidelity, because the interpolated region could not possible contain a feature of the size defined by the threshold within it. In some implementations, an along-track sampling interval can be an along-track density of A-Scans in metric space. If the density is below a user-defined threshold, object detections within that region can be excluded, or that region of the B-Scan image can be excluded from inference, or analysis results based on that region of the B-Scan image can have their confidence weighted down.

Referring again to FIG. 1, the B-Scan slicing system 40 can be communicatively coupled to the B-Scan processing system 50, which can be any system configured to automatically or semi-automatically analyze the normalized B-Scan sub-images 68 to, e.g., extract information about the scanned region 5 from the normalized B-Scan sub-images 68. In some implementations, the B-Scan processing system 50 can be a computer system similar to the B-Scan slicing system 40 and the B-Scan normalization system 30. That is, the B-Scan processing system 50 can be any suitable device or combination of devices that includes at least one data processor and memory storing instructions configured to cause the processor(s) to perform operations. For example, B-Scan processing system 50 can be or include a server, a desktop computer, a laptop computer, a tablet, a smart phone, an application-specific integrated circuit (ASIC), a field programmable gate array (FPGA), or a combination thereof. The processor(s) can include any processor suitable for the execution of a computer program. For example, the processor(s) can include a central processing unit (CPU), a graphics processing unit (GPU), a general-purpose micro-processor, or a special-purpose microprocessor, or a combination thereof. The memory can include read-only memory (ROM), random access memory (RAM), an optical disk (e.g., a CD), a flash memory device, a removable hard drive, an internal hard disk, and/or the like.

The B-Scan processing system 50 can be configured to perform a one or more tasks using the normalized B-Scan sub-images 68. In some embodiments, the B-Scan process-ing system 50 can be an object detection system configured to (e.g., by leveraging a computer vision model) use the normalized B-Scan sub-images to identify potential objects of interest (e.g., the object 7) contained in the scanned region 5. In some embodiments, the B-Scan processing system 50 can be configured to process the normalized B-Scan sub-images to estimate the depth below the surface of the scanned region 5 at which identified objects are located. Additional details about object detection and depth estima-tion methods for NDT can be found in U.S. patent applica-tion Ser. No. 19/200,159, filed May 6, 2025 and entitled "Automated Depth Estimation for Non-Destructive Test-ing," the entire contents of which are hereby incorporated herein by reference.

In the illustrated implementation, the B-Scan normaliza-tion system 30, the B-Scan slicing system 40, and the B-Scan processing system 50 are depicted in FIG. 1 as independent from one another. For example, the B-Scan normalization system 30 can be implemented using a first computer system, the B-Scan slicing system 40 can be implemented using a second computer system, and the B-Scan processing system 50 can be implemented using a third computer system. In these implementations, the sys-tems 30, 40, and 50 can be communicatively coupled to one another by wired connections, by one or more wireless networks (e.g., a Bluetooth network, a Wi-Fi network, etc.) or a combination thereof. In other embodiments, two or more of the B-Scan normalization system 30, B-Scan slicing system 40, and B-Scan processing system 50 can be imple-mented using the same computer system. For example, in some embodiments, the system 100 can include one com-puter system that is configured to perform the functions of the B-Scan normalization system 30, the B-Scan slicing system 40, and the B-Scan processing system 50.

Furthermore, in FIG. 1, the B-Scan normalization system 30, the B-Scan slicing system 40, and the B-Scan processing system 50 are depicted as independent from the NDT scanner 10. In such implementations, the B-Scan normal-ization system 30, the B-Scan slicing system 40, and the B-Scan processing system 50 can be implemented using, e.g., one or more servers or one or more laptop computers that can be selectively coupled to the NDT scanner 10. The systems 30, 40, and 50 can be communicatively coupled to receive data (e.g., the A-Scans 62) from the NDT scanner 10 by a wired connection, by a wireless network (e.g., a Bluetooth network, a Wi-Fi network, etc.), or a combination thereof. In other embodiments, one or more of the B-Scan normalization system 30, B-Scan slicing system 40, and B-Scan processing system 50 can be implemented using an on-board computer system of the NDT scanner 10 (e.g., the computer system that produces the A-Scans 62). Implement-ing one or more of the systems 30, 40, and 50 using a computer system that is not a component of the NDT scanner 10 can reduce the computational power required by the NDT scanner 10, thereby reducing the overall size of the scanner 10, facilitating the portability and maneuverability of the NDT scanner 10. Implementing one or more of the systems 30, 40, and 50 using a computer system that is a component of the NDT scanner 10 can enable B-Scans to be normalized, resized, and/or processed even in highly remote locations where network connectivity is limited or nonex-istent.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifi-cally described herein and illustrated in the accompanying drawings are non-limiting illustrative implementations and that the scope of the present invention is defined solely by the claims. The features illustrated or described in connec-tion with one illustrative implementation may be combined with the features of other implementations. Such modifica-tions and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims.

The invention claimed is:

1. A method comprising:

receiving, from a non-destructive testing (NDT) scanner, a plurality of A-Scans of a length of a scanned region;

generating a raw B-Scan of the scanned region using the plurality of A-Scans;

receiving, from a position sensor coupled to the NDT scanner, a plurality of distance measurements of the NDT scanner along the length of the scanned region;

matching each of the plurality of A-Scans with a distance measurement of the plurality of distance measurements to form a plurality of distance-assigned A-Scans; and normalizing the raw B-Scan, using the plurality of distance-assigned A-Scans, to form a normalized B-Scan, wherein each column of the normalized B-Scan represents the same distance along the length of the scanned region, wherein normalizing the raw B-Scan comprises:

identifying a plurality of uniform length segments constituting the length of the scanned region; and determining an A-Scan density corresponding to each of the plurality of uniform length segments using the plurality of distance-assigned A-Scans.

2. The method of claim 1, wherein normalizing the raw B-Scan further comprises:

determining that the A-Scan density corresponding to a first uniform length segment of the plurality of uniform length segments exceeds a first threshold density;

updating a first subset of the plurality of distance-assigned A-Scans to reduce the A-Scan density corresponding to the first uniform length segment.

3. The method of claim 2, wherein updating the first subset of the plurality of distance-assigned A-Scans comprises:

down-sampling the first subset to form a down-sampled subset of distance-assigned A-Scans corresponding to the first uniform length segment.

4. The method of claim 2, wherein updating the first subset of the plurality of distance-assigned A-Scans comprises:

averaging the first subset to form an averaged subset of distance-assigned A-Scans corresponding to the first uniform length segment.

5. The method of claim 2, wherein normalizing the raw B-Scan further comprises:

determining that the A-Scan density corresponding to a second uniform length segment of the plurality of uniform length segments is less than a second threshold density;

updating a second subset of the plurality of distance-assigned A-Scans to increase the A-Scan density corresponding to the second uniform length segment.

6. The method of claim 5, wherein updating the second subset of the plurality of distance-assigned A-Scans comprises:

generating, using a computational model, one or more synthetic distance-assigned A-Scans corresponding to the second uniform length segment;

updating the second subset of the plurality of distance-assigned A-Scans to include the one or more synthetic distance-assigned A-Scans.

7. The method of claim 6, wherein the computational model comprises a linear interpolation model or a spline interpolation model.

8. The method of claim 6, wherein the computational model comprises a machine learning model.

9. The method of claim 8, wherein the machine learning model comprises a generative adversarial network.

10. The method of claim 1, wherein the position sensor is an inertial measurement unit (IMU).

11. The method of claim 1, wherein the NDT scanner is a ground-penetrating radar (GPR) scanner.

12. A system comprising:

at least one processor; and non-transitory memory storing instructions that, when executed by the at least one processor, cause the at least one processor to perform operations comprising:

receiving, from a non-destructive testing (NDT) scanner, a plurality A-Scans of a length of a scanned region;

generating a raw B-Scan of the scanned region using the plurality of A-Scans;

receiving, from a position sensor coupled to the NDT scanner, a plurality of distance measurements of the NDT scanner along the length of the scanned region;

matching each of the plurality of A-Scans with a distance measurement of the plurality of distance measurements to form a plurality of distance-assigned A-Scans; and normalizing the raw B-Scan, using the plurality of distance-assigned A-Scans, to form a normalized B-Scan, wherein each column of the normalized B-Scan represents the same distance along the length of the scanned region, wherein normalizing the raw B-Scan comprises:

identifying a plurality of uniform length segments constituting the length of the scanned region; and determining an A-Scan density corresponding to each of the plurality of uniform length segments using the plurality of distance-assigned A-Scans.

13. The system of claim 12, further comprising the NDT scanner.

14. The system of claim 12, further comprising the position sensor.

15. The system of claim 12, wherein normalizing the raw B-Scan further comprises:

determining that the A-Scan density corresponding to a first uniform length segment of the plurality of uniform length segments exceeds a first threshold density;

updating a first subset of the plurality of distance-assigned A-Scans to reduce the A-Scan density corresponding to the first uniform length segment.

16. The system of claim 15, wherein normalizing the raw B-Scan further comprises:

determining that the A-Scan density corresponding to a second uniform length segment of the plurality of uniform length segments is less than a second threshold density;

updating a second subset of the plurality of distance-assigned A-Scans to increase the A-Scan density corresponding to the second uniform length segment.

17. The method of claim 16, wherein updating the second subset of the plurality of distance-assigned A-Scans comprises:

generating, using a computational model, one or more synthetic distance-assigned A-Scans corresponding to the second uniform length segment;

updating the second subset of the plurality of distance-assigned A-Scans to include the one or more synthetic distance-assigned A-Scans.

18. A non-transitory computer readable storage medium storing instructions that, when executed by at least one processor, cause the at least one processor to perform operations comprising:

receiving, from a non-destructive testing (NDT) scanner, a plurality A-Scans of a length of a scanned region;

generating a raw B-Scan of the scanned region using the plurality of A-Scans;

receiving, from a position sensor coupled to the NDT scanner, a plurality of distance measurements of the NDT scanner along the length of the scanned region;

matching each of the plurality of A-Scans with a distance measurement of the plurality of distance measurements to form a plurality of distance-assigned A-Scans; and normalizing the raw B-Scan, using the plurality of distance-assigned A-Scans, to form a normalized B-Scan, wherein each column of the normalized B-Scan represents the same distance along the length of the scanned region, wherein normalizing the raw B-Scan comprises:

identifying a plurality of uniform length segments constituting the length of the scanned region; and determining an A-Scan density corresponding to each of the plurality of uniform length segments using the plurality of distance-assigned A-Scans.

*    *    *    *    *